United States Patent

Solomon et al.

[11] Patent Number: 5,272,724
[45] Date of Patent: Dec. 21, 1993

[54] WIDEBAND SIGNAL SYNCHRONIZATION

[75] Inventors: James D. Solomon, Palatine; Steven C. Jasper, Hoffman Estates, both of Ill.

[73] Assignee: Motorola, Inc., Schaumburg, Ill.

[21] Appl. No.: 695,125

[22] Filed: May 3, 1991

[51] Int. Cl.⁵ .......................................... H04L 27/28
[52] U.S. Cl. ..................... 375/38; 370/121; 375/113; 375/59; 375/75
[58] Field of Search ........... 375/113, 38, 40, 47, 375/59, 75; 364/726; 455/36.1, 37.1; 370/69.1, 121

[56] References Cited

U.S. PATENT DOCUMENTS 3,204,045  8/1965  Tuthill et al. ................. 455/37.1
3,372,335  3/1965  Takada ......................... 375/113 X
4,742,514  5/1988  Goode et al. .................... 370/97
5,170,413  12/1992  Hess et al. ...................... 375/38

Primary Examiner—Stephen Chin
Assistant Examiner—Tesfaldet Bocure
Attorney, Agent, or Firm—Susan L. Lukasik; Steven G. Parmelee

[57] ABSTRACT

In order to synchronize wideband signals in time while reducing the necessary amount of processing, a number of narrowband signals (203, 205, 207, and 209) are modulated (503) on their own frequency sub-carriers, such that the summation of these modulated signals remains within the bandwidth of the wideband signal (201). This composite signal is transmitted (507) to a receiver, which uses a matched filter bank (405) to recover timing data from each transmitted frequency sub-carrier.

26 Claims, 4 Drawing Sheets

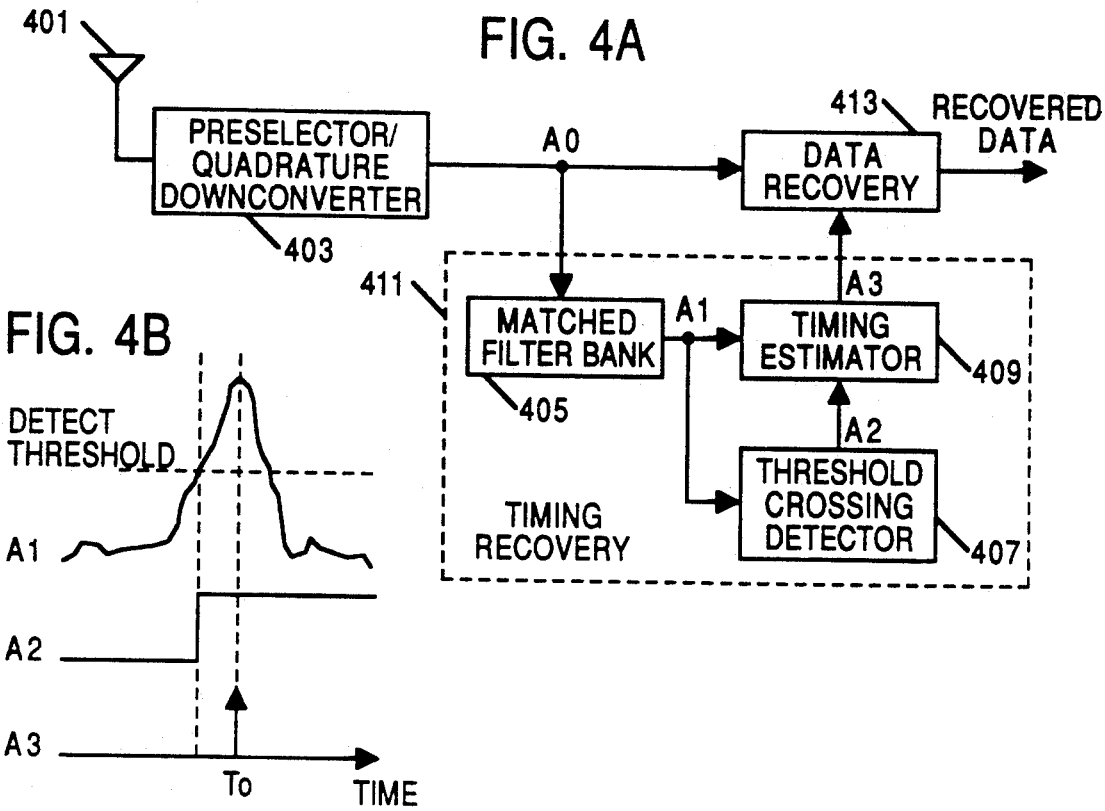
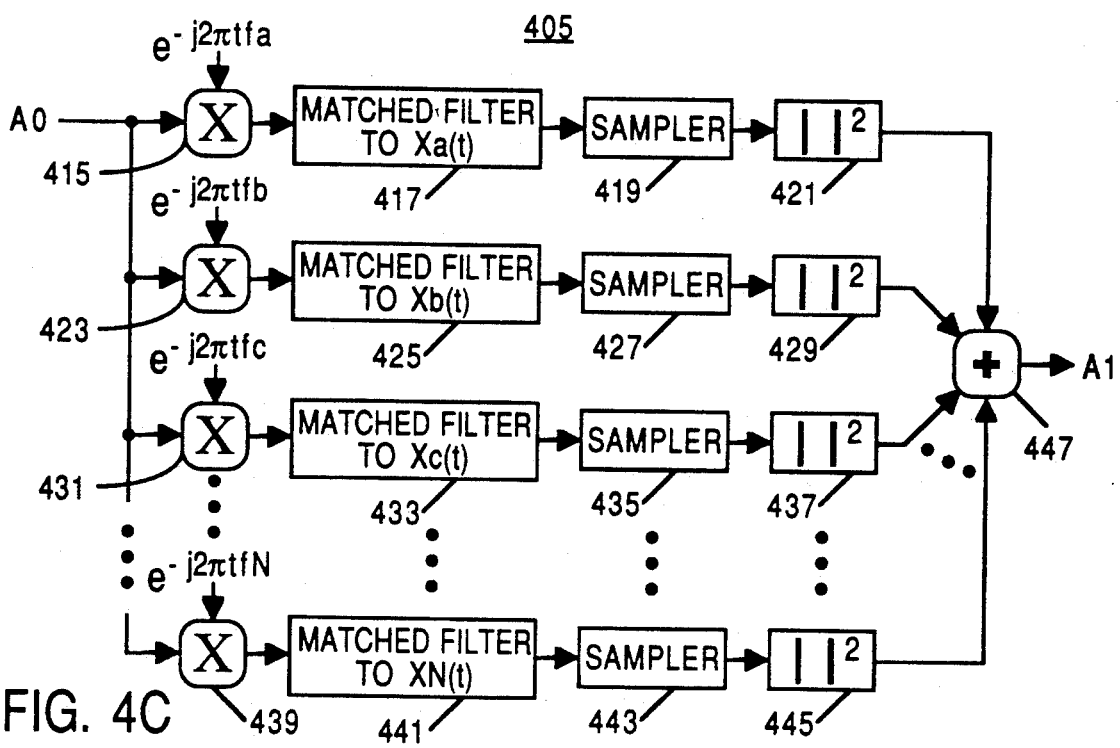

5,272,724

WIDEBAND SIGNAL SYNCHRONIZATION

FIELD OF THE INVENTION

This invention relates to wideband radio transmissions. More particularly, this invention relates to synchronization of wideband radio transmission signals.

BACKGROUND OF THE INVENTION

In digital communication systems, timing synchronization is necessary for proper reception and decoding of information. Typically, a predetermined waveform, called a synchronization (sync) pattern, is combined with the information-bearing signal to be transmitted to enable the receiver to synchronize to the incoming signal. This combining usually takes the form of time interleaving or multiplexing. The sync pattern is usually designed to lie within the same frequency band as the data portion of the signal. The receiver uses a matched filter (whose impulse response is matched to that of the sync pattern), in combination with an energy or power detector and a peak detector, in order to derive timing information for proper reception. This process is illustrated in FIG. 1A. A receiver 101 receives the incoming signal from the channel. The instantaneous energy or power of a sync matched filter 103 output is then found by an energy/power detector 105. When the sync waveform arrives at the receiver 101, a peak occurs as is illustrated by signal 1A1. The presence and time of occurrence of the peak is determined by the peak detector 107, which then provides this timing information, signal 1A2, to the data detector 109 for proper decoding of data.

The duration of the energy peak of the sync matched filter output is on the order of the reciprocal of the bandwidth of the sync pattern. This is usually a desirable situation, since a shorter peak provides more precise timing information, and more precise timing is usually necessary for wider bandwidth data signals. In an implementation characterized by analog components, the continuous version of the waveform 1A1 is available for determination of the timing peak. In receivers implemented using digital signal processors (DSPs), only a sampled version is available. The sampling rate must be high enough for the peak detector to be able to recognize the presence and location of the peak. This may require a large amount of DSP processing power if the bandwidth of the sync signal is large, such as in the case of a wideband signal, which is wider in bandwidth than a voice signal. For instance, if the bandwidth of the sync signal is on the order of 1 MHz, the sync matched filter output may be on the order of 1 microsecond long. If four samples across that peak are necessary for proper operation of the peak detector, the sampling rate of the process must be on the order of 4 MHz. Such a high processing rate may require an enormous amount of DSP processing power and consequently a relatively enormous amount of electrical power. This amount of power would quickly drain a battery on a portable radio, which already has a relatively short battery life.

Such high processing power is unavoidable if DSP implementation is desired and if very accurate timing accuracy is needed. If the timing accuracy requirement can be relaxed, as is possible, for example, with the use of multi-channel modulation for the information portion of the signal, then the bandwidth of the sync waveform can perhaps be reduced to less than that of the data signal, thereby reducing the sampling rate and processing power required. This reduced bandwidth idea is illustrated in FIG. 1B. Unfortunately, this approach does not operate satisfactorily in environments (e.g., mobile radio channels) where the channel's frequency response is not flat across the band of interest (i.e., frequency selective channels). Generally the wider the signal bandwidth (the higher the data rate), the more likely it is that the channel will appear to be frequency selective. In such cases, a narrowband sync waveform may be so grossly attenuated that it can provide no useful timing information, even though other portions of the data signal may still be recoverable.

Accordingly, a method for synchronizing wideband signals characterized by reduced processing requirements, as well as robust performance in frequency selective channels, is required.

SUMMARY OF THE INVENTION

The invention encompasses an apparatus for and a method of obtaining timing synchronization for a wideband signal between a transmitter and a receiver. A composite signal comprised of a sum of at least a first narrowband signal modulated on a first sub-carrier frequency signal and a second narrowband signal modulated on a second sub-carrier frequency signal is transmitted. The composite signal is received. The received composite signal is applied to at least a first matched filter, tuned to the first sub-carrier frequency and producing a first filter output, and a second matched filter, tuned to the second sub-carrier frequency and producing a second filter output. The first filter output and the second filter output are summed to derive synchronization.

BRIEF DESCRIPTION OF THE DRAWINGS

FIG. 4A is a block diagram of a communication unit receiver in accordance with the invention.

FIG. 4B is a timing diagram showing signals generated in FIG. 3A in accordance with the invention.

FIG. 4C is a block diagram of a matched filter in accordance with the invention.

DESCRIPTION OF A PREFERRED EMBODIMENT

The following describes a method and apparatus for wideband signal synchronization with reduced processing requirements. In a radio capable of transmitting/receiving wideband signals, a number of narrowband synchronization signals are modulated about their own frequency sub-carrier. The sum of these modulated signals remains within the frequency band of the wideband signal. At a receiver, the synchronization signals are separately demodulated and match filtered. The outputs of the matched filters are combined to derive timing information. Since the processing is carried out on signals whose bandwidths are narrower than that of the wideband signal, processing requirements are reduced in comparison with prior approaches. Since at least two narrowband synchronization signals are provided, performance is robust in frequency selective channels.

In the preferred embodiment, a number, N, of synchronization signals is chosen to represent the synchronization (sync) signal for a wideband signal. Each sync signal is a narrowband signal, i.e., occupies less frequency spectrum, when compared to the wideband signal. Each sync signal is modulated about its own frequency sub-carrier such that the modulated signal resides within the bandwidth boundaries of the wideband signal. The N modulated sync signals are added together, the result of which also resides within the bandwidth boundaries of the wideband signal, to form the sync signal that is transmitted with the wideband data signal to the receiver. The receiver uses a matched filter for each of the sync signals and an adder to sum the magnitude-squared output of each matched filter. Timing information is then derived from this sum.

Figure 2:
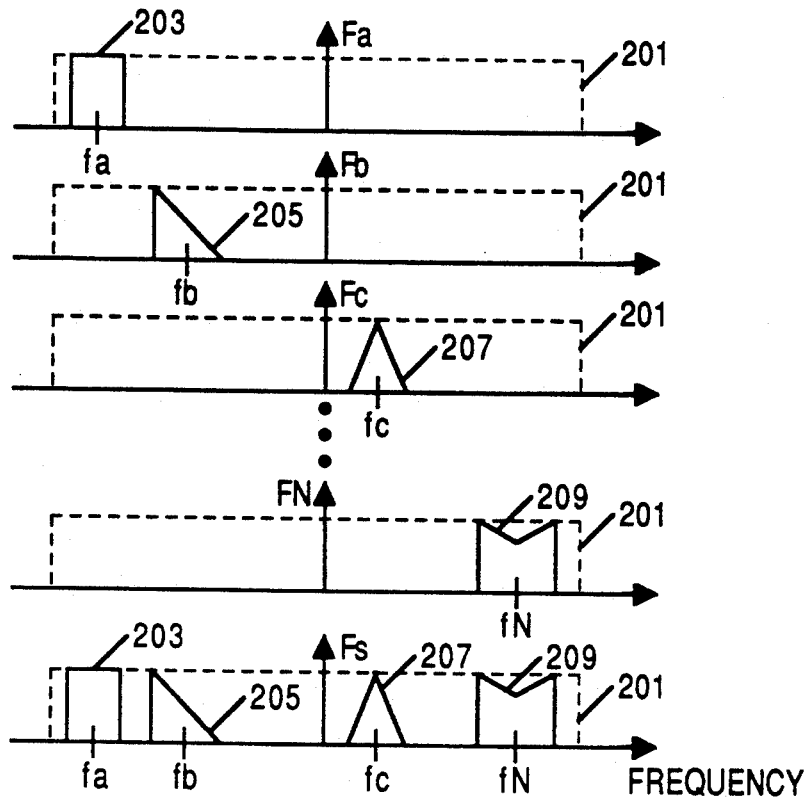
FIG. 2 is a frequency spectrum diagram in accordance with the invention.

FIG. 2 is a frequency spectrum diagram in accordance with the invention. The bandwidth of the wideband signal 201 is shown as a dotted line in each of the frequency diagrams Fa, Fb, Fc, FN, and Fs. A sync signal Xa(t) with Fourier transform Fa 203 is modulated about frequency sub-carrier fa. A sync signal Xb(t) with Fourier transform FN 205 is modulated about frequency sub-carrier fb. A sync signal Xc(t) with Fourier transform Fc 207 is modulated about frequency sub-carrier fc. A sync signal XN(t) with Fourier transform FN 209 is modulated about frequency sub-carrier fN. The frequency spectrum of the sum, Xs(t), of the N modulated sync signals is shown in diagram Fs, and represents the frequency spectrum of the sync signal generated in the preferred embodiment, as shown in FIG. 2. The spectrum Fs of the composite signal Xs(t) falls within the frequency band of and occupies less bandwidth than the wideband signal 201. For example, the wideband signal 201 has bandwidth of 1 MHz, each signal on each sub-carrier is bandwidth of 12 kHz, and N equals 5 sync signals sent. The sum of the frequency signals is 60 kHz, which is significantly less than 1 MHz. This is beneficial to processing power requirements. Also, since five sync signals are provided, up to four may be attenuated by the channel and synchronization can still be achieved at the receiver.

Figure 1A:
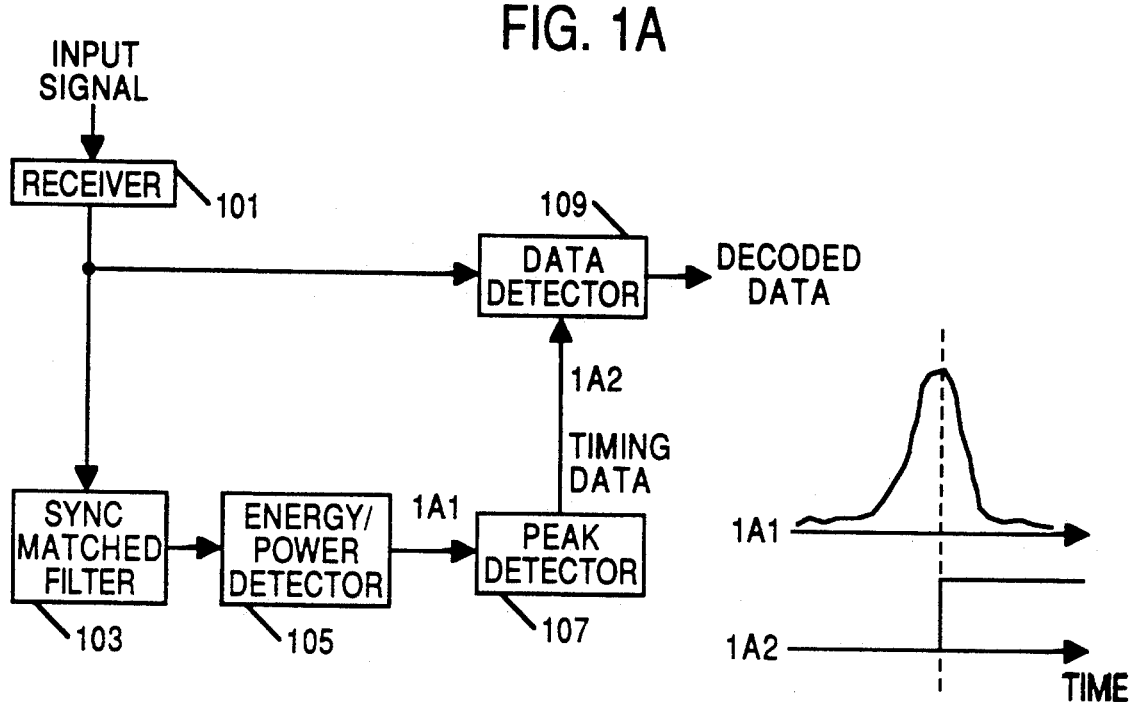
FIG. 1A is a block diagram of a receiver with synchronization.
Figure 1B:
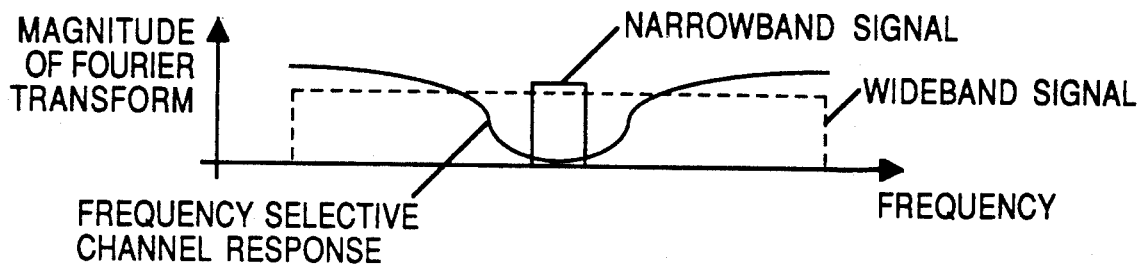
FIG. 1B is a frequency spectrum of a wideband signal.
Figure 3:
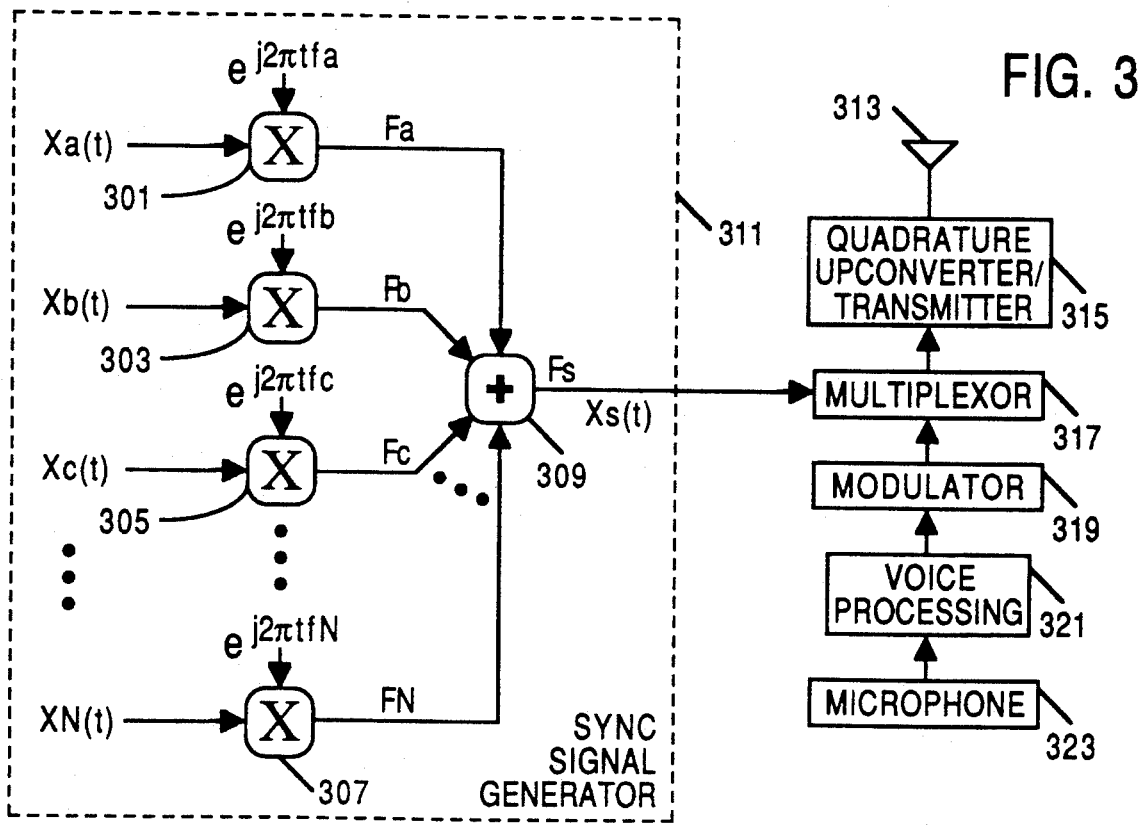
FIG. 3 is a block diagram of a communication unit transmitter in accordance with the invention.

FIG. 3 is a block diagram of a communication unit transmitter. In this embodiment, the composite sync signal, as well as the information-bearing signal, are shown at the baseband, i.e., in a band centered substantially at a frequency of zero Hz. The synchronization signal Xa(t) is mixed with the signal $e^{j2\pi tfa}$ in mixer 301. The output of the mixer 301 has frequency characteristic Fa, as shown in FIG. 1 for example, and is fed into adder 309. The synchronization signal Xb(t) is mixed with the signal $e^{j2\pi tfb}$ in mixer 303. The output of the mixer 303 has frequency characteristic Fb, as shown in FIG. 1 for example, and is fed into adder 309. The synchronization signal Xc(t) is mixed with the signal $e^{j2\pi tfc}$ in mixer 305. The output of the mixer 305 has frequency characteristic Fc, as shown in FIG. 1 for example, and is fed into adder 309. The synchronization signal XN(t) is mixed with the signal $e^{j2\pi tfN}$ in mixer 307. The output of the mixer 307 has frequency characteristic FN, as shown in FIG. 2 for example, and is fed into adder 309. Mixers 301, 303, 305, and 307 and adder 309 represent the sync signal generator 311. The result of the adder 309, with frequency characteristic Fs, as shown in FIG. 2 for example, is combined with the information-bearing signal in a multiplexor 317. The output the multiplexor is input to a quadrature upconverter/transmitter 315, which converts the signal to the proper transmit frequency and transmits the resultant signal through an antenna 313. In the preferred embodiment, a microphone 323 inputs voice data to a voice processing block 321, which outputs processed voice to a modulator 319. The output from the modulator 319 and sync signal generator 311 enter a multiplexor 317 that properly times transmission of the sync signal and processed voice. Alternatively, data may be substituted for the processed voice.

FIG. 4A is a block diagram of a communication unit receiver. An antenna 401 and a preselector/quadrature downconverter 403 receive and process the sync signal and wideband signal to a baseband signal, A0, as is known in the art. The frequency band of the baseband signal A0 should be substantially equivalent to that of the corresponding baseband signal Xs(t) at the transmitter. The signal A0 is fed into a timing recovery block 411, which outputs a timing signal, A3, that supplies timing information to a data recovery block 413, which outputs recovered data. Within the timing recovery block 411, a matched filter bank 405, as shown in the block diagram in FIG. 4C, outputs signal A1 to both a timing estimator 409 and a threshold detector 407. The threshold detector outputs signal A2 to the timing estimator 409, which outputs the timing signal, A3, to the data recovery block 413, as is known in the art. Examples of signals A1, A2, and A3 are shown in FIG. 4B. When signal A1 crosses the detect threshold, as determined by the threshold crossing detector 407, the signal A2 transitions to its high state and the timing estimator 409 locates the peak of signal A1 at time To, which is output to the data recovery block 413.

FIG. 4C is a block diagram of a matched filter bank in accordance with the invention. The input to the matched filter bank is the signal A0, which is fed into a series of matched filters. The apparatus to recover the part of the sync signal modulated about frequency fa includes a mixer 415, with inputs of the signal A0 and the signal $e^{-j2\pi tfa}$ and output going to a matched filter to Xa(t) 417. The output of the matched filter 417 is fed to a sampler 419. The output of the sampler 419 is fed into a magnitude-squared calculator 421, which computes the instantaneous power or energy of each sample. The output of the magnitude-squared calculator 421 is input to an adder 447. The apparatus to recover the part of the sync signal modulated about frequency fb includes a mixer 423, with inputs of the signal A0 and the signal $e^{-j2\pi tfb}$ and output going to a matched filter to Xb(t) 425. The output of the matched filter 425 is fed to a sampler 427. The output of the sampler 427 is fed into a magnitude-squared calculator 429, the output of which is input to the adder 447. The apparatus to recover the part of the sync signal modulated about frequency fc includes a mixer 431, with inputs of the signal A0 and the signal $e^{-j2\pi tfc}$ and output going to a matched filter to Xc(t) 433. The output of the matched filter 433 is fed to a sampler 435. The output of the sampler 435 is fed into a magnitude-squared calculator 437, the output of which is input to the adder 447. The apparatus to recover the part of the sync signal modulated about frequency fN includes a mixer 439, with inputs of the signal A0 and the signal $e^{-j2\pi tfN}$ and output going to a matched filter to XN(t) 441. The output of the matched filter 441 is fed to a sampler 443. The output of the sampler 443 is fed into a magnitude-squared calculator 445, the output of which is input to the adder 447. The output of the adder 447 is the signal A1, as shown in FIG. 4A and 4B.

In the preferred embodiment, the matched filter output rate is set to the minimum rate needed to allow an adequate number of samples across the peak of signal A1. This conserves processing power. A judicious choice of sub-carrier frequencies in the preferred embodiment enables the use of an efficient Fast-Fourier Transform (FFT) filter bank implementation to realize the matched filter bank, which further reduces the required amount of processing. Sub-carrier frequencies may be chosen to avoid reoccurring frequency nulls that distort or attenuate data. Any combination of uniform/non-uniform sub-carrier frequency spacing will successfully gain synchronization, although the amount of processing may not be minimal.

As shown in FIG. 2, each synchronization signal has different characteristics. In the preferred embodiment, synchronization is achieved using the same synchronization signal for Xa(t), Xb(t), Xc(t), ..., XN(t). Thus the same matched filters are used in the matched filter bank for each sub-carrier frequency, reducing processing power. Any combination of similar/different synchronization signals will remain successful.

In the preferred embodiment of the present invention, the sync signal generator 311, timing recovery block 411, and data recovery block 413 are embodied in a DSP (Digital Signal Processor) clocked at 27 MHz, such as a DSP56001 available from Motorola, Inc. All steps in the flowchart of FIG. 5 except for steps 507 and 509 are performed by the DSP described above.

Figure 5:
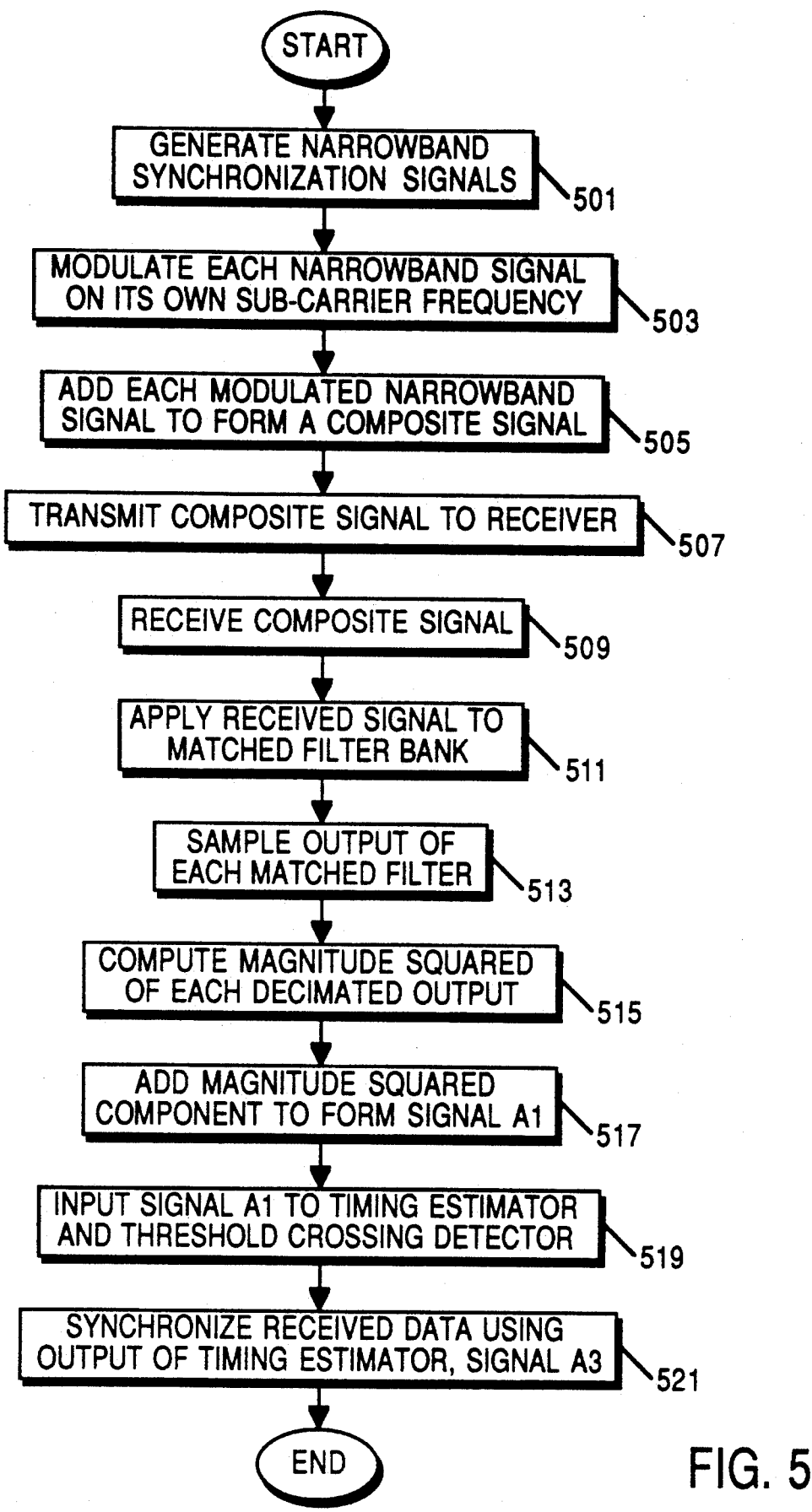
FIG. 5 is a flowchart showing wideband signal synchronization in accordance with the invention.

FIG. 5 is a flowchart showing wideband signal synchronization. Steps 501 through 507, inclusive, are performed in the transmitter. Steps 509 through 521, inclusive, are performed in the receiver. Narrowband synchronization signals are generated at step 501. Each narrowband synchronization signal generated in step 501 is modulated on its own sub-carrier frequency, where sub-carrier frequencies and consequently the spacing between the frequencies are programmed into the DSP, at step 503. The modulated signals from step 503 are added together to form a composite signal at step 505. The composite signal is transmitted at step 507 to the receiver, which receives the composite signal at step 509. At step 511, the received composite signal is applied to a matched filter bank, as shown in FIG. 4C. The output of each matched filter is processed with its own sampler at step 513, and then the magnitude-squared of each of the sampler outputs is computed at step 515. At step 517, all the magnitude-squared components computed in step 515 are added together to form signal A1, as shown in FIG. 4B. Signal A1 is input at step 519 to the threshold crossing detector 407 and the timing estimator 409, producing signal A3 (see text for FIG. 4A) that is used to synchronize the received data at step 521.

What is claimed is:

1. A method of obtaining timing synchronization for a wideband signal between a transmitter and a receiver comprising the steps of:
   transmitting a composite signal comprised of a sum of at least a first narrowband signal modulated on a first sub-carrier frequency signal and a second narrowband signal modulated on a second sub-carrier frequency signal;
   receiving said composite signal;
   applying said received composite signal to a first matched filter, wherein said first matched filter is turned to said first sub-carrier frequency and produces a first filter output;
   applying said received composite signal to a second matched filter, wherein said second matched filter is turned to said second sub-carrier frequency and produces a second filter output; and
   combining said first filter output and said second filter output to derive synchronization to-the-wideband-signal.

2. The method of claim 1, further comprising the step of spacing said sub-carrier frequencies essentially uniformly.

3. The method of claim 1, further comprising the step of generating said first narrowband signal and said second narrowband signal with essentially the same frequency response.

4. The method of claim 1, further comprising the step of generating a fast-Fourier transform filter bank to realize said at least two matched filters.

5. The method of claim 1, wherein the method is applied to at least three narrowband signals, such that said composite signal is comprised of a sum of at least a first narrowband signal modulated on a first sub-carrier frequency signal and a second narrowband signal modulated on a second sub-carrier frequency signal and a third narrowband signal modulated on a third sub-carrier frequency signal; said received composite signal is further applied to a third matched filter, turned to said third sub-carrier frequency and producing a third filter output; and said first filter output, said second filter output, and said third filter output are combined to derive synchronization.

6. The method of claim 1, wherein said composite signal occupies less bandwidth than the wideband signal.

7. A transmitter of a wideband signal for use in a communication system which employs timing synchronization for the wideband signal between the transmitter and a receiver, the transmitter comprising:
   means for generating a composite signal comprised of a sum of at least two predetermined narrowband synchronization signals each modulated on a different predetermined sub-carrier frequency signal; and
   means for transmitting said composite signal with a wideband signal, such that said composite signal is used to synchronize to said wideband signal at a receiver.

8. The transmitter of claim 7, further comprising means for spacing said sub-carrier frequencies essentially uniformly.

9. The transmitter of claim 7, further comprising means for generating said at least two narrowband signals having essentially the same frequency response.

10. The method of claim 7, wherein said composite signal occupies less bandwidth than the wideband signal.

11. A receiver for use in a communication system, the receiver obtaining timing synchronization for a wideband signal from a transmitter, the receiver comprising:
   means for receiving a composite signal comprised of a sum of at least a first narrowband signal modulated on a first sub-carrier frequency signal and a second narrowband signal modulated on a second sub-carrier frequency signal;

means for applying said received composite signal to a first matched filter, wherein said first matched filter is turned to said first sub-carrier frequency and produces a first filter output;

means for applying said received composite signal to a second matched filter, wherein said second matched filter is turned to said second sub-carrier frequency and produces a second filter output; and means for combining said first filter output and said second filter output to derive synchronization to a received wideband signal.

12. The receiver of claim 11, further comprising means for generating a fast-Fourier transform filter bank to realize said at least two matched filters.

13. The method of claim 11, wherein said composite signal occupies less bandwidth than the wideband signal.

14. A method of obtaining timing synchronization for a wideband signal between a transmitter and a receiver comprising the steps of:

generating at least a first narrowband synchronization signal modulated on a first sub-carrier frequency signal and a second narrowband signal modulated on a second sub-carrier frequency signal;

summing said at least two modulated narrowband synchronization signals forming a composite signal;

transmitting said composite signal;

receiving said composite signal;

applying said received composite signal to at least a first matched filter, tuned to said first sub-carrier frequency and producing a first filter output, and a second matched filter, tuned to said second sub-carrier frequency and producing a second filter output; and computing magnitude squared of said first filter output and said second filter output;

combining said magnitude squared of said first filter output and said second filter output to derive synchronization to-the-wideband-signal.

15. The method of claim 14, further comprising the step of spacing said sub-carrier frequencies essentially uniformly.

16. The method of claim 14, further comprising the step of generating said at least two narrowband signals having the same frequency response.

17. The method of claim 14, further comprising the step of generating a fast-Fourier transform filter bank to realize said at least two matched filters.

18. The method of claim 14, wherein the method is applied to at least three narrowband signals, such that a third narrowband signal, modulated on a third sub-carrier frequency, is generated; said composite signal is comprised of a sum of said at least said at least three modulated narrowband synchronization signals; said received composite signal is further applied to a third matched filter, tuned to said third sub-carrier frequency and producing a third filter output; magnitude squared is computed for said third filter output; and said magnitude squared of said first filter output, said second filter output, and said third filter output are combined to derive synchronization.

19. The method of claim 14, wherein said composite signal occupies less bandwidth than the wideband signal.

20. A transmitter for use in a communication system obtaining timing synchronization for a wideband signal between the transmitter and a receiver, the transmitter comprising:

means for generating at least a first predetermined narrowband synchronization signal modulated on a first sub-carrier frequency signal and a second predetermined narrowband synchronization signal modulated on a second sub-carrier frequency signal, wherein said first sub-carrier frequency and said second sub-carrier frequency are different;

means for summing said at least two modulated narrowband synchronization signals forming a composite signal; and means for transmitting said composite signal.

21. The transmitter of claim 20, further comprising means for spacing said sub-carrier frequencies essentially uniformly.

22. The transmitter of claim 20, further comprising means for generating said at least two narrowband signals having the same frequency response.

23. The method of claim 20, wherein said composite signal occupies less bandwidth than the wideband signal.

24. A receiver for use in a communication system obtaining timing synchronization for a wideband signal between a transmitter and the receiver, the receiver comprising:

means for receiving the wideband signal;

means for receiving a composite signal, comprised of a sum of at least a first narrowband synchronization signal modulated on a first sub-carrier frequency signal and a second narrowband signal modulated on a second sub-carrier frequency signal;

means for applying said received composite signal to a first matched filter, wherein said first matched filter is tuned to said first sub-carrier frequency and produces a first filter output;

means for applying said received composite signal to a second matched filter, wherein said second matched filter is tuned to said second sub-carrier frequency and produces a second filter output;

means for computing magnitude squared of said first filter output and said second filter output; and means for combining said magnitude squared of said first filter output and said second filter output to derive synchronization to-the-wideband-signal.

25. The receiver of claim 24, further comprising means for generating a fast-Fourier transform filter bank to realize said at least two matched filters.

26. The method of claim 24, wherein said composite signal occupies less bandwidth than the wideband signal.

* * * * *

UNITED STATES PATENT AND TRADEMARK OFFICE
CERTIFICATE OF CORRECTION

PATENT NO. : 5,272,724
DATED : December 21, 1993
INVENTOR(S) : Solomon et al.

It is certified that error appears in the above-identified patent and that said Letters Patent is hereby corrected as shown below:

Claim 1, Col. 6, Line 7, replace "turned" with --tuned--.

Claim 5, Col. 6, Line 30, replace "turned" with --tuned--.

Claim 11, Col. 7, Line 3, replace "turned" with --tuned--.

Claim 11, Col. 7, Line 7, replace "turned" with --tuned--.

Signed and Sealed this

Twenty-eighth Day of June, 1994

Attest:

BRUCE LEHMAN

*Attesting Officer*   *Commissioner of Patents and Trademarks*